United States Patent [19]

Brunemann

[11] 3,945,630

[45] Mar. 23, 1976

[54] ASSEMBLY SUPPORT FOR PRE-FABRICATING BUILDING PANELS

[76] Inventor: James C. Brunemann, R.R. 5, Box 31, Brookville, Ind. 47012

[22] Filed: May 9, 1975

[21] Appl. No.: 576,102

[52] U.S. Cl............................ 269/321 F; 144/288 C

[51] Int. Cl.²............................................ B23Q 3/00

[58] Field of Search..................... 144/288 R, 288 C; 29/200 J, 200 P; 269/321 F, 321 S, 37, 40, 41, 43, 289, 25

[56] References Cited

UNITED STATES PATENTS

| | | | |
|---|---|---|---|
| 2,626,643 | 1/1953 | Kantzler | 269/321 F |
| 2,754,862 | 7/1956 | Kemp, Jr. | 144/288 C |
| 3,109,640 | 11/1963 | Schneckloth | 269/321 F |
| 3,302,942 | 2/1967 | Hollomon | 269/321 F |
| 3,371,921 | 3/1968 | Hollomon et al. | 144/288 R |
| 3,458,182 | 7/1969 | Flachbarth et al. | 269/321 F |
| 3,866,644 | 2/1975 | Stubbs | 144/288 C |

*Primary Examiner*—Al Lawrence Smith
*Assistant Examiner*—Robert C. Watson
*Attorney, Agent, or Firm*—Melville, Strasser, Foster & Hoffman

[57] ABSTRACT

An apparatus for pre-fabricating building panels which will assure accuracy in locating the studs of each panel relative to the longitudinal track members thereof and which in addition will assure accuracy in locating door and framing members within the panel.

11 Claims, 25 Drawing Figures

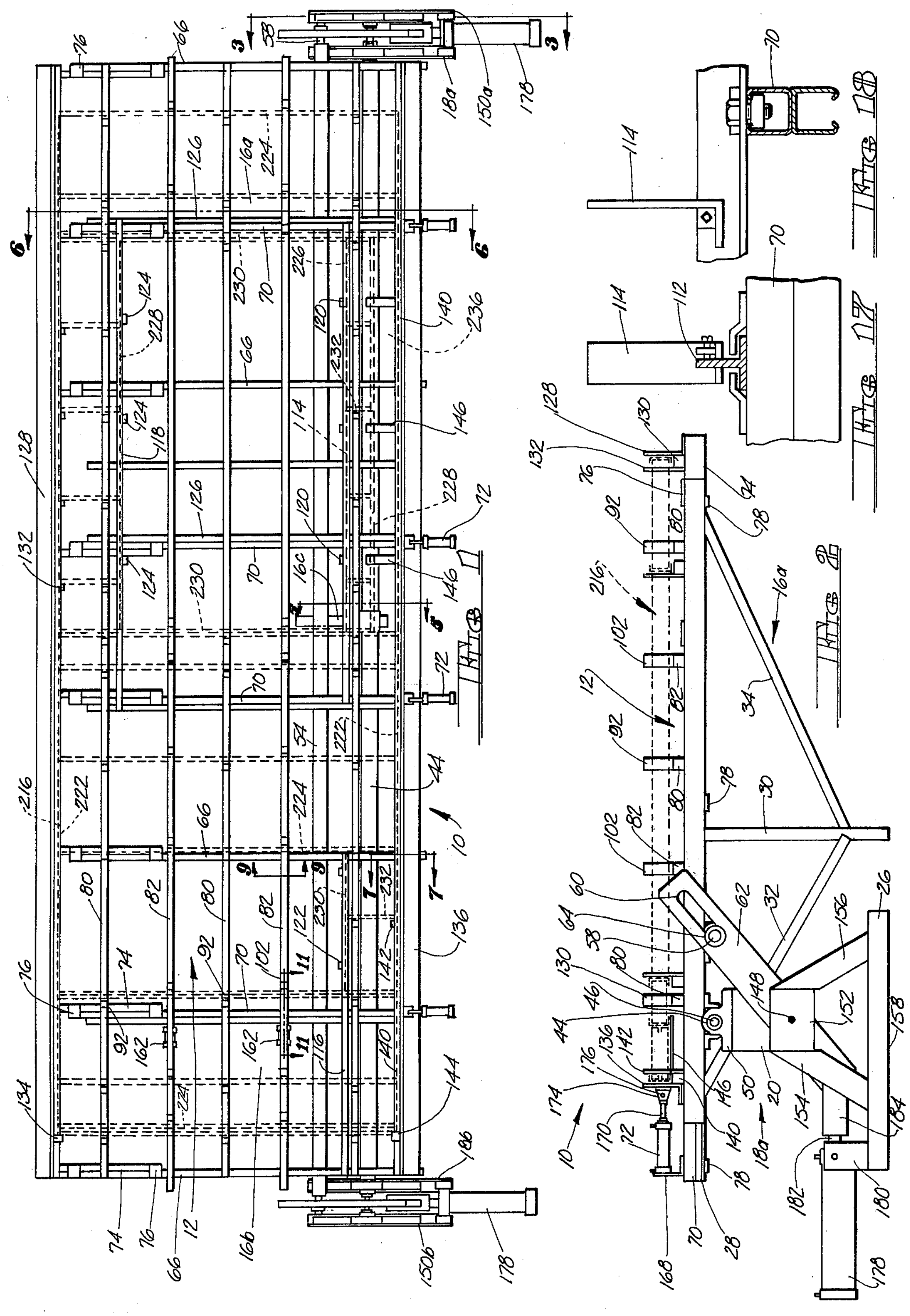

20
20
216
218
222
224
226
228
230
232
234
235
236

ASSEMBLY SUPPORT FOR PRE-FABRICATING BUILDING PANELS

BACKGROUND OF THE INVENTION

1. Field of the Invention

This invention relates to an assembly support for pre-fabricating building wall panels including studs, track members and door and window framing members.

2. Description of the Prior Art

Builders have long sought an apparatus or assembly support which will readily enable the complete fabrication of building walls or panels ready for erection as a part of a building. Such an assembly or support would minimize the labor involved in the assembly of pre-fabricating building wall panels and would thus tend to offset the spiralling costs of building construction. However, the prior art has generally been unsuccessful in such attempts.

Exemplary of the prior art are the devices disclosed in U.S. Pat. No. 2,626,643, in the name of John J. Kantzler, and in U.S. Pat. NO. 3,371,921, in the name of Frank A. Hollomon, et al. While the apparatus disclosed and taught in these patents have been successful in many respects, such devices have had major short comings. For example, the prior art devices have been unable to satisfactorily pre-fabricate building wall panels in such a way as to assure accuracy in locating the studs of the wall panel relative to the longitudinal track members and in addition to assure accuracy in locating door and window frame members within the wall panel. Such devices have also been unable to provide an apparatus which includes means for locating and subsequently clamping of all studs, track, door and window framing members for fastening or securing the wall panel parts together. Such prior art devices have also failed to include a universal adjustment for stud engaging elements so that they may be longitudinally repositioned to any desired location, thus enabling the assembly of multiple studs in the assembly of door and window framing members at any desired location within the panel. Such prior art devices have not provided a unique method of rotatably positioning the clamped wall panel frame to any desired position between the horizontal and the horizontally inverted position so as to enable the pre-fabricating of horizontal members within the mid span of the wall panel frame and to remove the completed, assembled panel, without lifting or manually handling the panel, onto a conveyor for transfer to a site for erection as part of a building complex. Finally, the prior art devices have been unsatisfactory in providing an apparatus which will include locators which may be adjusted to accept floor panel framing members, thus allowing for the most part the complete framing of a building structure.

SUMMARY OF THE INVENTION

Very briefly considered, the present invention contemplates an assembly support for pre-fabricating building panels which will assure accuracy in locating the studs of the panels relative to the longitudinal track members thereof and which in addition will assure accuracy in locating door and framing members within the panels.

In its broadest application, the assembly support includes a first series of members in parallel spaced relationship extending transversely of the support. A second series of members is provided in parallel spaced relationship extending longitudinally of the support and adjustably mounted to the first channel members. Selected ones of the second members are shiftable longitudinally of the support.

A first adjustable fixed stop is mounted along one end of the first members extending longitudinally of the support and parallel to the second members. A second stop is mounted along the other end of the first members parallel to the first stop and the second members and shiftable in directions toward and away from the first stop. Means are provided for shifting the second stop.

A plurality of stud locators are provided adjustably and fixed to the second members.

Finally, means are provided to shift the selected ones of the second members.

In operation, the studs are located between selected ones of the stud locators of the shiftable and non-shiftable second members and are locked into position when the shiftable ones of the second members are shifted, and the studs and track members are locked in their respective panel positions whenever the second stop is shifted toward the first stop.

In a preferred embodiment track locators are provided to locate the door and framing members within the panel on the assembly support.

In still a further embodiment the assembly support is rotatably mounted on aligned pedestals for rotation through 180°.

In still a further embodiment of the members include channel members and the stud locators and track locators are slidable and lockable therein.

Finally, the means to shift the selected ones of the second members longitudinally, as well as the means to shift the second stop toward and away from the first stop, and the means to rotate the assembly support, may comprise fluid pressure actuated means.

The assembly support of the present invention in one unit solves all of the aforementioned short comings attributable to the prior art devices.

BRIEF DESCRIPTION OF THE DRAWINGS

FIG. 1 is a top plan view of the assembly support of the present invention.

FIG. 2 is an enlarged side elevational view of the assembly support of FIG. 1.

FIG. 17 is a fragmentary cross sectional view showing a further embodiment of the stud locators.

FIG. 18 is a fragmentary side view of FIG. 17, partially in section.

DESCRIPTION OF THE PREFERRED EMBODIMENTS

Figure 5:
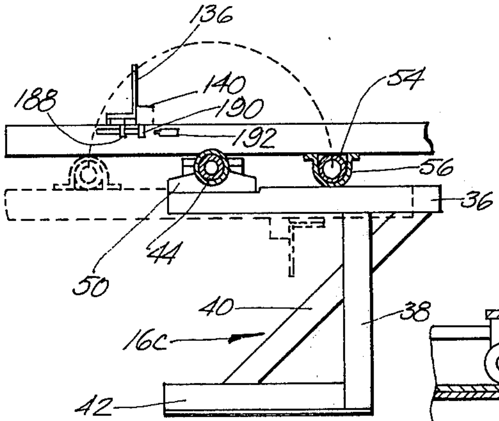
FIG. 5 is an enlarged, fragmentary, cross sectional view taken along the line 5—5 of FIG. 1.

Referring first to FIG. 1, it will be seen that the assembly support 10 of the present invention includes an elongated supporting structure or table 12, which may, of course, be constructed in various lengths and widths, as desired, depending upon the length and height of panels to be assembled. The table 12 is supported in a normally horizontal work assembly position 14 by the upright truss type supporting legs 16*a*, 16*b*, 16*c* which are exposed between right hand end leg 18*a* and left hand end leg 18*b*. As best seen in FIGS. 1 and 5, the support legs 16*c* is located at or near the mid point of the table 12.

Figure 3:
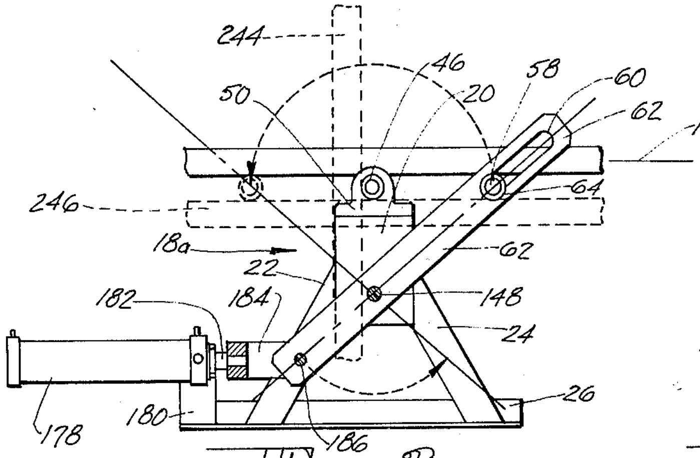
FIG. 3 is an enlarged, fragmentary, partial sectional elevation view taken along the line 3—3 of FIG. 1.
Figure 4:
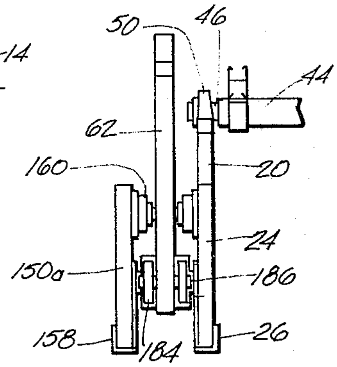
FIG. 4 is a fragmentary right side view, partially in section, of FIG. 3.

The end legs or pedestals 18*a* and 18*b* are opposite in fabrication but the same in size and number of parts. The end leg or pedestal 18*a*, which is exemplary, comprises a center member 20 supported by oppositely opposed outwardly extending legs 22 and 24 and a bottom angle support 26, as best seen in FIGS. 2, 3 and 4.

Figure 6:
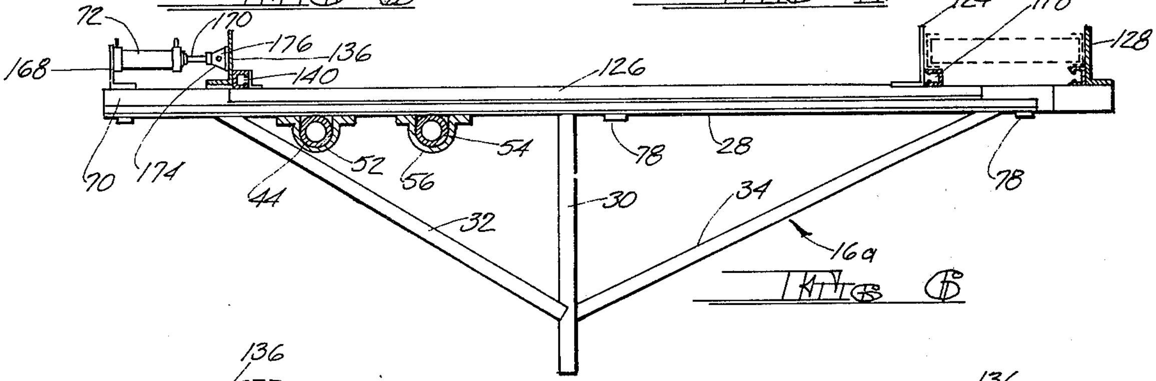
FIG. 6 is an enlarged, partial cross sectional view, taken along the line 6—6 of FIG. 1.

As can best be seen from FIGS. 2 and 6, the support legs 16*a* and 16*b*, which are identical, include a horizontal member 28 connecting to the vertical member 30 at the approximate mid point and the diagonal support braces 32 and 34. The center support leg 16*c*, as best seen in FIG. 5, comprises a horizontal member 36 attached to a vertical member 38 with a diagonal bracing member 40 attached to a bottom angle support 42.

The assembly support 10 includes a pivot tube 44 extending longitudinally thereof. The pivot tube 44 is provided with aligned trunnions or journals 46 extending from the ends thereof through the pillow blocks 50 which are mounted on top of the center members 20 of the pedestals 18*a* and 18*b*. As best seen in FIG. 5, the pivot tube 44 is supported at or near its mid point by means of a pillow block 50 attached to the horizontal member 36 of the support leg 16*c*. The horizontal member 28 of each truss type support legs 16*a* and 16*b* is attached to the pivot tube 44 by means of the pipe straps 52, as best seen in FIG. 6.

Figure 12:
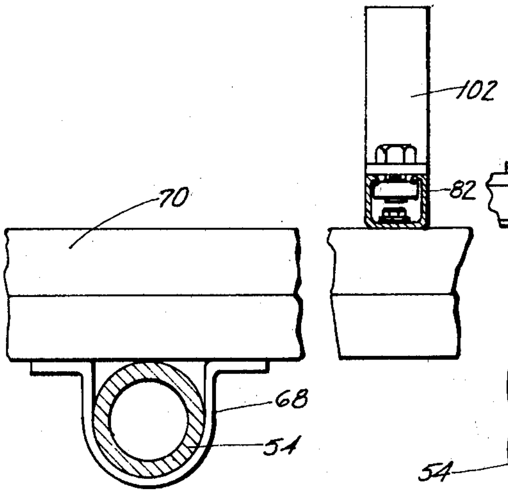
FIG. 12 is a fragmentary left side view of FIG. 11, partially in section.
Figure 11:
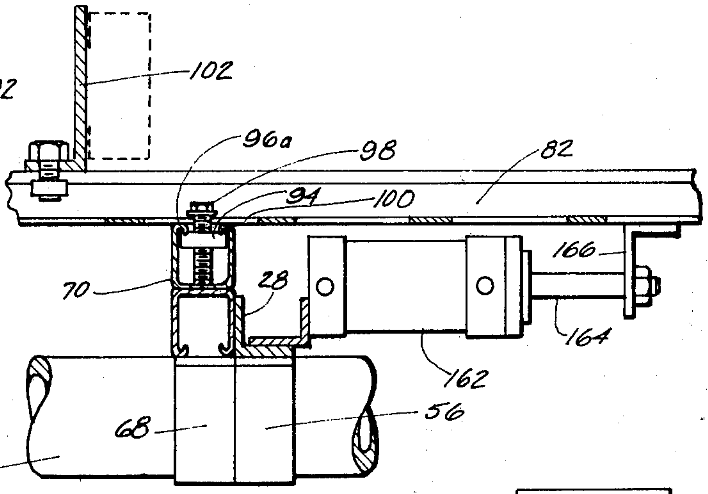
FIG. 11 is an enlarged, fragmentary, cross sectional view taken along the line 11—11 of FIG. 1.

A rotating tube 54 is attached to the horizontal members 28 of the truss supports 16*a* and 16*b* by means of the pipe straps 56, as best seen in FIGS. 6, 11 and 12. The rotating tube 54 is provided with aligned trunnions or journals 58 which extend from the ends thereof. The trunnions 58 engage the slots 60 of the pivot arms 62. The pivot arms 62 in turn engage the set collars 64.

The table 12 includes a first series of members 66 extending transversely of the table. The members 66 are secured in parallel spaced relationship to the pivot and rotating tubes 44 and 54, respectively, by means of the pipe clamps 68. It has been found that the members 66 preferrably comprise back to back C-channels. Also attached to and at right angles to the pivot tube 44 and the rotating tube 54 are members 70 of the same configuration as members 66 but of slightly longer length to accept fluid activated cylinders 72, which will be more fully described hereinafter. Members 74 of the same cross section as members 66 and 70 are attached to the members 66 and 70 through the splice plates 76.

The truss type support legs 16*a* and 16*b*, which add support and rigidity to the table 12, are attached immediately adjacent to the members 70 through the attachment tabs 78.

The table 12 also includes a second series of members 80 and 82 in parallel spaced relationship extending longitudinally of the table and adjustably mounted to the transverse members 66 and 70. The members 80 and 82 are preferrably channels of C-shape configuration and, as can be seen in FIGS. 1, 2, 9 and 10, they are attached at right angles to the members 66 and 70. The adjustable attachment of the member 80 to the members 70 and 74 preferrably comprises a nut 84 engaging the inner lips 86, 86*a* and 86*b* of the members 66 and 70, respectively, and a bolt 88 engaging the nut 84 through the slots 90 in the channel 80. The stud locators 92 are adjustably secured to the members 80 in a similar manner as described for the attachment of the members 80 to the members 66 and 70.

The members 82 are substantially identical to the members 80. However, the members 82 are slidably attached in parallel spaced relationship and at right angles to the members 66 and 70, as best seen in FIGS. 1, 2, 11 and 12. The slidable attachment is affected by a nut 94 engaging the lips 96*a* and 96*b* of the members 66 and 70, respectively, and a bolt 98 of sufficient length to engage the nut 94 through the slots 100 of the members 82, thus affecting a security between the nut 94 and the inside bottom of the members 66 and 70. As can be seen, this attachment will provide a slidable relationship between the channels 82 with respect to the members 66 and 70. The stud locators 102 are adjustably secured to the members 82 in the same manner as previously described for attachment of members 80 to members 66 and 70. However, it will be noted that the stud locators 102 are faced in the opposite direction from the stud locators 92.

Alternate configurations of the stud locators 92 and 102 is shown in FIGS. 15 through 18. As can be seen, in FIGS. 15 and 16, the longitudinal bar 104 is of a T-shaped configuration and is adjustably attached to the member 66 (or 70) through Z-shape bars 106, which engage the bottom flange of the bar 104 and connect to the members 66 or 70 in a similar manner as previously described for the attachment of the members 82 to the members 66 and 70. The stud locator 108 is adjustably fastened to the bar 104 by means of the set screw 110.

The stud locator of FIGS. 17 and 18 comprises a longitudinal bar 112, which is also of T-shape configuration and slidably attached at right angles to the members 66 (or 70) as previously described. The stud locators 114 are attached to the bar 112 as previously described for the attachment of the stud locators 108 to the bar 104.

The members 114, 116 and 118, which may also be of channel configuration, all include track locators, as will be more fully explained hereinafter, for locating the door and window assemblies. More particularly, the member 114 is substantially identical to the member 80 and is adjustably attached at right angles to the channels 66 and 70, as shown in FIGS. 1 and 2. A plurality of track locators 120 are adjustably attached to the members 114 in a manner similar to the previously described attachment of the members 80 to the members 66 and 70.

The member 116 and the track locators 122 shown in FIG. 1 are substantially identical to the member 114 and track locators 120. The member 118 is substantially identical to the member 80 and is adjustably attached to the members 126, as shown in FIGS. 1, 2, 6 and 11. As can be seen, the member 126 is mounted in slidable relationship with respect to the member 70. The track locators 124 are adjustably attached to the member 118 in a similar manner as previously described for the track locators 120 and 122.

A first adjustable fixed stop 128 is mounted along one end of the members 66 and 70 so as to extend longitudinally of the support table 12. As shown in FIGS. 1, 2 and 6, the first fixed stop 128 preferrably comprises an angle member which is adjustably attached to the members 74 which are attached to the members 66 and 70 as previously explained. A member 130 substantially identical to the member 80 is attached to the angle 128. The stud locators 132 as well as the index stop 134 are adjustably attached to the member 130.

Figure 7:
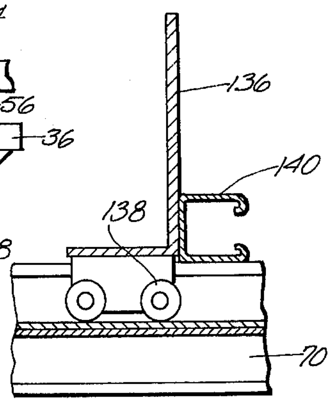
FIG. 7 is an enlarged, fragmentary cross sectional view taken along the line 7—7 of FIG. 1.
Figure 8:
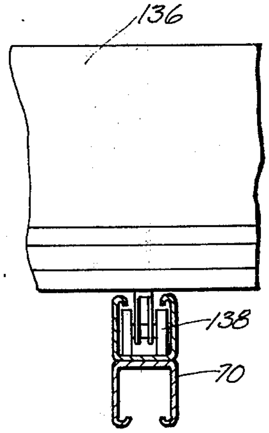
FIG. 8 is a fragmentary, right side view of FIG. 7.
Figure 9:
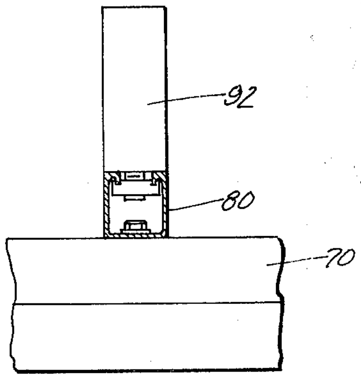
FIG. 9 is an enlarged, fragmentary cross sectional view taken along the line 9—9 of FIG. 1.
Figure 10:
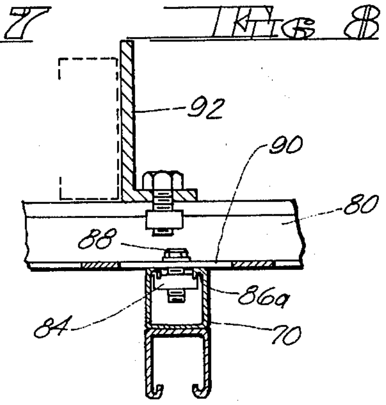
FIG. 10 is a fragmentary right side view of FIG. 9.

A second stop 136 is mounted along the other end of the members 66 and 70 parallel to the first stop 128 and the members 80 and 82. The second stop 136, which preferrably comprises an angle member, is shiftable in directions toward and away from the first stop 128. This is accomplished by means of the rollers 138, as best seen in FIGS. 7 and 8. More particularly, a member 140 is attached to the angle member 136. Adjustably attached to the member 140 are the track locators 142 and the track index stop 144. A joist rest 146 as well as the member 126 are also attached to the member 140.

Turning now to FIGS. 2, 3 and 4, it will be seen that each of the pivot arms 62 is rotatably connected about the pivot pin 148 to an end leg or pedestal 18*a* and 18*b* and to an outer pivot pin support leg 150*a* and 150*b*, respectively. The outer pivot pin support legs 150*a* and 150*b* are opposite in fabrication but the same in size and number of parts. Each outer pivot pin support leg 150*a*, 150*b* includes a center member 152 supported by oppositely opposed out rigger legs 154 and 156 and a bottom angle support 158. The connection between the pivot pin 148 and the end legs or pedestals 118*a* and 118*b* and the outer pivot pin legs 150*a* and 150*b* is affected through the flange units 160, which are attached to each center member 20 of the end legs or pedestals 18*a* and 18*b* and each center member 152 of the outer pivot pin legs 150*a* and 150*b*.

Turning now to FIG. 11, it will be seen that the fluid power cylinders 162 are attached to the horizontal member 28 of the left hand truss type support leg 16*a*. The fluid power cylinders 162 are positioned immediately below the members 82, with the piston rods 164 thereof attached to the angle brackets 166, which is in turn are attached to a member 82.

As best seen in FIGS. 1, 2 and 6, the fluid power cylinders 72 are attached to the angle brackets 168, which in turn are attached to the members 70. The piston rod 170 of each power fluid cylinder 72 is attached to the eye 172, which in turn is attached to the clevis 174 by way of the clevis pin 178. The clevis 174 in turn is attached to the angle member 136.

As best seen in FIGS. 1, 2, 3 and 4, the fluid power cylinders 178 are pivotally attached to the vertical members 180, which in turn are attached to the angle support 26 of each end leg or pedestals 18*a* and 18*b* and to the angle support 158 of each outer pin support leg 150*a* and 150*b*. The piston rod 182 of the fluid power cylinder 178 is attached to the clevis 184. The clevis 184 is pivotally attached to a pivot arm 62 by means of the clevis pin 186.

As best seen in FIG. 5, an angle bracket 188 is attached at the approximate mid point of the angle member 136. The angle bracket 188 is provided with an adjustably threaded rod 190. A limit switch 192 is attached to the members 66 or 70 in line with the threaded rod 190.

Figure 13:
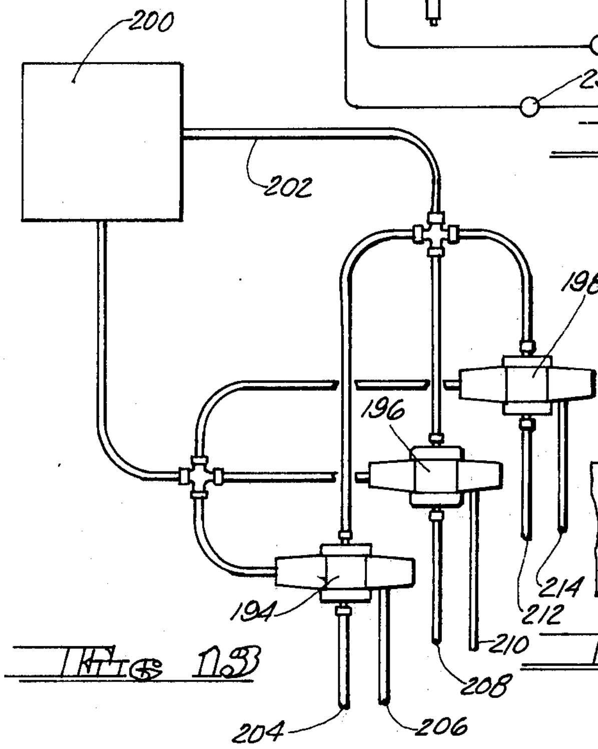
FIG. 13 is a diagramatic view illustrating the fluid power circuits of the assembly support.
Figure 15:
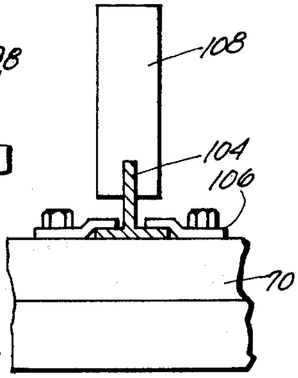
FIG. 15 is a fragmentary partial cross sectional view showing an alternate embodiment for adjustably locating the stud locators.
Figure 16:
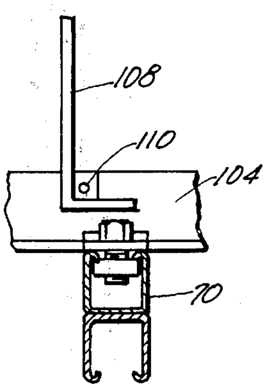
FIG. 16 is a fragmentary right side view of FIG. 22, partially in section.

An incompressible fluid power circuit for the assembly support 10 of the present invention is diagrammatically illustrated in FIG. 13. As can be seen, the fluid power circuit includes three normally closed, three position, spring return solenoid valves 194, 196 and 198, connected to a suitable fluid power source 200 by the fluid ducts 202. The fluid conduits 204 and 206 connect the solenoid valve 194 with the fluid power cylinder 162. In like manner, the fluid conduits 208 and 210 connect the solenoid valve 196 with the fluid power cylinders 72. Finally, the fluid ducts 212 and 214 connect the solenoid valve 198 with the fluid power cylinders 178.

Figure 14:
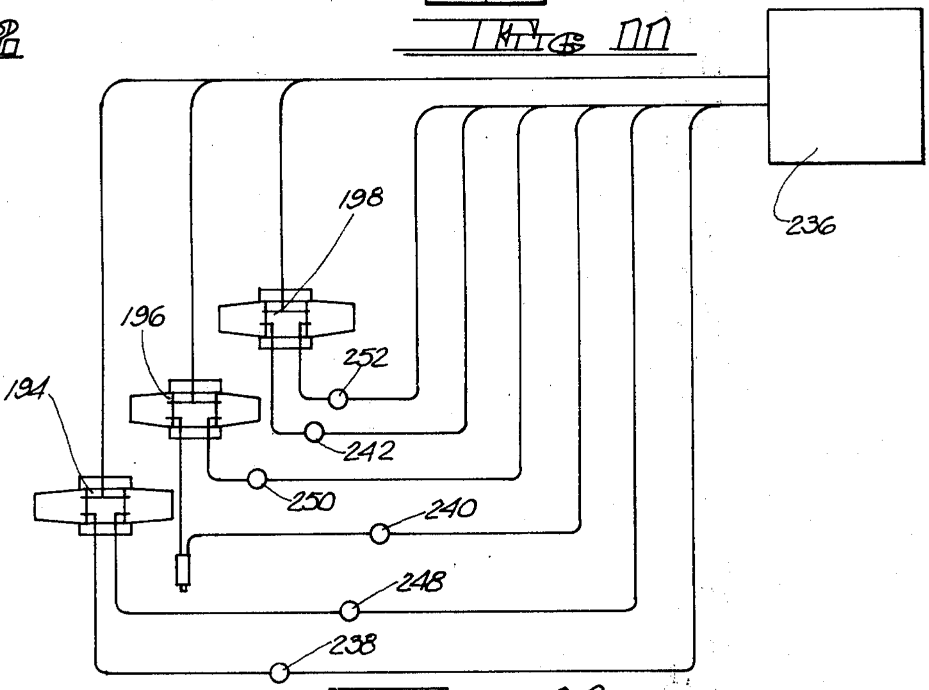
FIG. 14 is a diagramatic view illustrating the electric power circuits of the assembly support.

The electric circuits of the assembly support 10 of the present invention, as best seen in FIG. 14, will be explained in terms of the operation of the device.

A typical pre-fabricated building wall panel 216 which may be assembled utilizing the assembly support 10 of the present invention is disclosed in FIGS. 19 through 25. As can be seen, the wall panel 216 is provided with a window opening 218 and a door opening 220. For purposes of an exemplary showing, the wall panel members are of a metal framing design with top and bottom members comprising a U-shape track 222. The members connecting the tracks 222 are, for purposes of an exemplary showing, a C-shape and defined as studs 224. The window opening 218 is framed by a head track 226, a sill track 228, and cripple studs 230. The head track 226 is supported by the jack studs 232. The sill track 228 is supported by the jack studs 234. Above the window head track 226 is a joist beam 236, which is necessary for structural load transfer. The joist beam 236 engages the top track 222 and rests on the window head jack stud track 238, which in turn is supported by the cripple studs 230.

Figures 19, 20, 21, 22, 23, 24, 25:
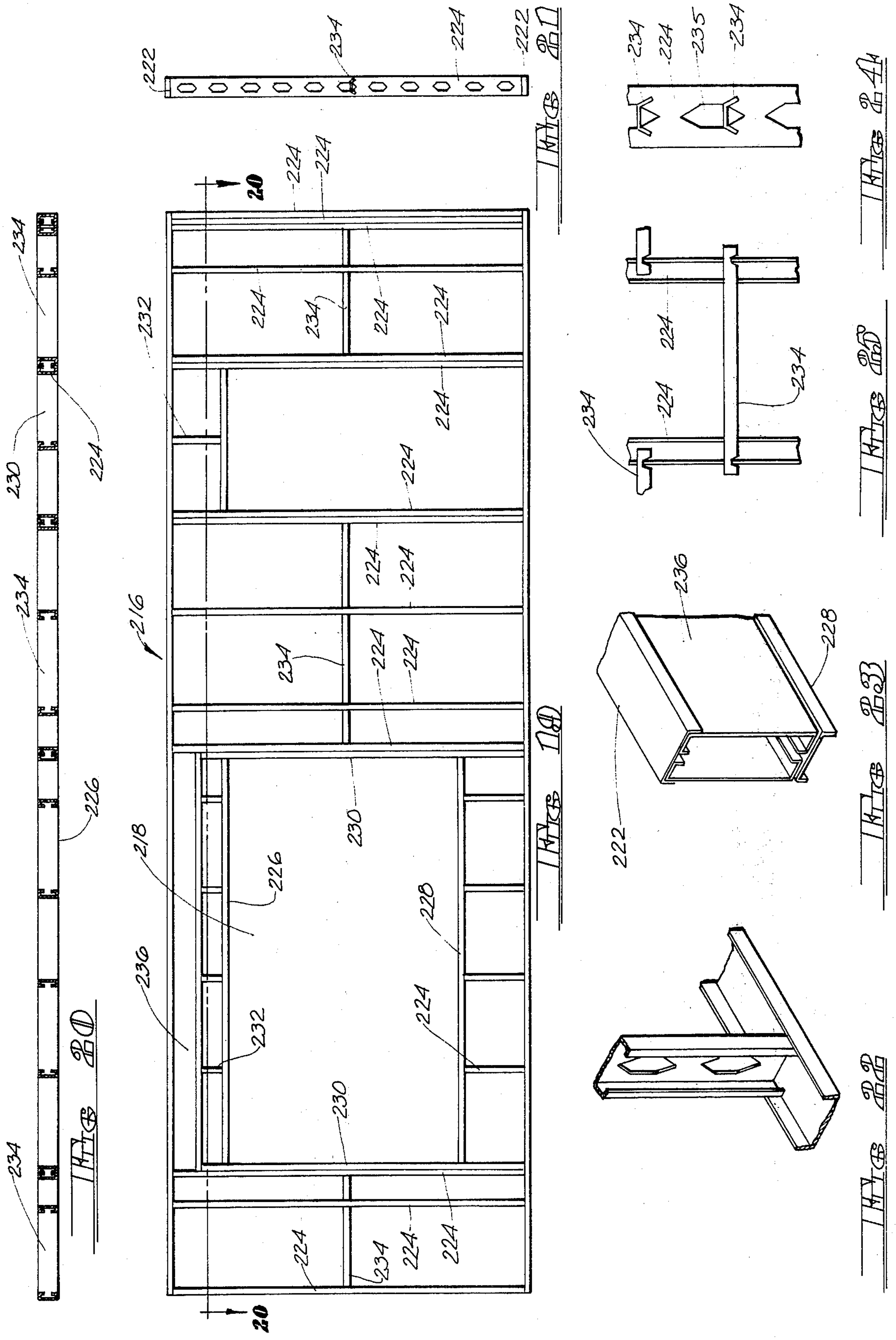
FIG. 19 is a fragmentary elevational view of a wall panel assembled on the assembly support of the present invention.
FIG. 20 is a cross sectional view taken along the line 20—20 of FIG. 19.
FIG. 21 is a side elevational view of the panel of FIG. 19.
FIG. 22 is an enlarged, fragmentary isometric view of a typical stud to track connection in a wall panel.
FIG. 23 is an enlarged, fragmentary isometric view taken substantially along the line 23—23 of FIG. 19.
FIG. 24 is an enlarged, fragmentary view at the mid section of FIG. 21.
FIG. 25 is a fragmentary left side view of FIG. 24.

The door opening 220 is framed on each side by the double studs 224 and the head track 230. The head track 230 is supported by the jack stud 232. In order to prevent torsional buckling of the studs 224, the wall panel frame 216 is provided with a horizontal member 234 engaging the studs 224 at their approximate mid point. The horizontal member 234 may be utilized to bridge a plurality of studs 224, as shown in FIG. 19, or it may be of a specific length to bridge two studs 224 in a staggard arrangement as shown in FIGS. 24 and 25. FIG. 22 discloses a typical connection between the tracks 222, 226, 228, 238 and the studs 224, 232, 234 and 232. The wall panel frame 216 is indicated by dotted lines in the assembly support 10 of FIGS. 1 and 2.

The operation of the assembly support 10 of the present invention will now be described with respect to the assembly of the exemplary wall panel frame 216.

Initially, the stud and track locators of all of the members of the assembly support 10 may be positioned when the cylinder rod 164 of the fluid power cylinder 162 is fully extended and when the cylinder rod 170 of the fluid power cylinder 178 is extended to a position where the adjustable rod 190 engages the limit switch 192. In this regard, the angle members 128 and 136 are positioned oppositely and parallel to each other so as to be acceptable to the height of the wall panel frame 216. The track index stops 134 and 144 are then positioned oppositely and in a line perpendicular to the angel members 128 and 136. The member 116, with the track locators 122, and the stud locators 142, are positioned to accept the door head track 230 and the door head jack studs 232. The member 114, with the track locators 120, and the joist header rests 146, are then positioned to accept the window head track 226, the window head track studs 232, the joist header 236, and the joist header track 228. The member 118, with the track locators 124, and the stud locators 132, are positioned to accept the window sill track 228 and the window sill jack studs 234. The members 80, with the stud locators 92, and the members 82, with the stud locators 102, are then positioned to accept the studs 224 and the cripple studs 230.

Reference will now be made to FIG. 14, which shows a diagramatic view illustrating the electric power circuits of the assembly support 10. It will, of course, be understood that the solenoid valves 194, 196 and 198, as well as the switches which will be described hereinafter, are connected to a suitable electric power source, which, for purposes of explanation, has been designated as 236.

During operation, the reverse switch 238 is initially depressed, activating the solenoid valve 194 to a position allowing the passage of fluid through the conduit or duct 206 leading to the fluid power cylinder 162. Fluid pressure through the duct 206 causes a retraction of the cylinder rod 164 of the power cylinder 162. The retraction of the cylinder rod 164 moves each angle bracket 166 in the members 82, thus causing the stud locators 102 to be moved from right to left, as shown in FIG. 11, and from left to right as seen in FIG. 1, affecting an open or indexing position between the stud locators 92 and 102. The reverse switch 240 is then depressed so as to activate the solenoid valve 196 to a position allowing fluid pressure throught the duct 210 leading to the fluid power cylinders 72. Fluid pressure through the duct 210 causes a retraction of each cylinder rod 182 of the fluid power cylinders, which through its respective eye 172, clevis pin 178 and clevis 174, moves its respective angle member 136 from right to left as seen in FIG. 2, affecting an open position between the angle members 136 and 128, and which through the member 140, the member 126 and the member 118 affect an open or indexing position between the track locators 124 and the angle member 128.

The wall panel tracks 222 are then placed on the members 130 and 140 and against the angle membes 128 and 136, with the track opened towards each other. The studs 224 and 230 are then placed between the stud locators 92 and 102 and opened in the directions as shown in FIG. 20. The joist header 236 is then placed on the joist header rests 146 and the engaging track 222. The joist header 228 is placed on the joist header rests 146 with the header track 228 opened away from the joist header 228. The window head track 226 is placed on the channel 114 and against the track locators 120 with the track 232 opened toward the angle member 136. The window jack studs 232 are opened in the direction as shown in FIG. 20 and placed against the stud locators. 92, slightly engaging the window head track 226 and the joist header track 228. The door head track 230 is then placed on the member 116 and against the track locators 122, with the door head track 230 opened towards the angle member 136. The door jack stud 232, which is opened in the direction as shown in FIG. 20, is placed against the stud locators 92 and 142 so as to slightly engage the track 222 and the door head track 230. The window sill track 228 is opened in the direction of the angle member 128 and placed on the channel 118 and against the track locators 124. The window sill jack studs, which are opened in the direction as shown in FIG. 20, are placed against the stud locators 92 and 132, slightly engaging the track 222 and the window sill track 228.

With the components of the wall panel frame 216 so positioned, the forward switch 238 is depressed so as to activate the solenoid valve 194 to a position which will allow fluid pressure through the duct 204 leading to the fluid power cylinders 162. Fluid pressure through the duct 204 causes each of the cylinder rods 164 to extend, thus moving the stud locators 102 to a position affecting a clamping of the studs 224 and 230 between the stud locators 92 and 102. The forward switch 240 is then depressed so as to activate the solenoid valve 196 to a position allowing fluid pressure through the duct 208 and to the fluid power cylinders 72. Fluid pressure through the duct 208 causes the extension of each of the cylinder rods 170 until the threaded rod 190 engages the limit switch 192, thus affecting movement of the angle member 136 and the channel 118 to a position affecting a clamping of the remaining components of the wall panel frame 216, with the exception of the horizontal member 234. With the wall panel frame 216 in the horizontal position 14, as shown in FIGS. 1 and 2, the wall panel frame 216 components, with the exception of the horizontal member 234, can be fastened or secured together by any suitable means.

The forward switch 242 is then depressed so as to activate the solenoid valve 198 to a position which will allow fluid pressure through the duct 212 leading to the fluid power cylinders 178. Fluid pressure through the duct 212 causes an extension of each of the cylinder rods 182. Through the clevis 184 and pivoting about the clevis pin 186, the pivot arms 62 rotate about the pivot pins 148 in a counter clockwise direction, as best seen in FIG. 3. As the pivot arms 62 rotate, the trunnions 58 slidably move within the slots 60 of the pivot arms 62, affecting a rotating movement of the support table 12 about the pivot tube 44. At or near the vertical position, which is designated by phantom lines 244 in FIG. 3, the forward switch 242 is released, deenergizing the solenoid valve 198 and the loss of fluid pressure to the fluid power cylinders 178. While the assembled wall panel frame 216 is at or near the vertical position 244, the horizontal member or members 234 may be positioned through the stud openings 235, as best seen in FIG. 24, and fastened or secured as desired. The forward switch 242 is again depressed, causing further counterclockwise rotation of the pivot arms 62. At or near the inverted horizontal position of the table 12, designated by phantom lines 246 in FIG. 3, the cylinder rods 182 may reach their full extension, or if necessary a limit switch such as the limit switch 192 may be installed in the electric circuit to cause a desired stoppage of rotation.

In order to release the fabricated wall panel 216 from the table 12 for conveyance to storage or to the erection site, the reverse switches 248 and 250 are depressed. After the fabricated wall panel frame 216 is removed, the reverse switch 252 is depressed and the table is caused to rotate clockwise to its original position for acceptance of other wall panel frame components.

It should be noted that the threaded rod 190 which engages the limit switch 192 may be adjusted for slight or small variations in the height of wall panel frames 216. However, for large or major changes in wall panel frame height, the splice plate 76 joining the channel 74 with the channel 66 and 70 may be adjusted accordingly.

It will be apparent to the skilled worker in the art that numerous modifications can be made in the invention without departing from the scope and spirit. Accordingly, no limitations are intended except in so far as specifically set forth in the claims which follow.

I claim:

1. An assembly support for prefabricating building panels which will assure accuracy in locating the studs of a panel relative to the longitudinal track members thereof comprising:

a. a first series of members in parallel spaced relationship extending transversely of said support;
b. a second series of members in parallel spaced relationship extending longitudinally of said support and adjustably mounted to said first members, selected one of said second members being shiftable longitudinally of said support;
c. a first adjustable fixed stop mounted along one end of said first members extending longitudinally of said support and parallel to said second members;
d. a second stop mounted along the other end of said first members parallel to said first stop and said second members and shiftable in directions toward and away from said first stop;
e. means for shifting said second stop;
f. a plurality of stud locators adjustable and fixed to said second members; and
g. means to shift said selected ones of said second members;

whereby studs are located between selected ones of said stud locators and are locked into position when the shiftable ones of said second members are shifted, and whereby the studs and track members are locked in their respective panel positions whenever said second stop is shifted toward said first stop.

2. The assembly support according to claim 1, wherein a longitudinal pivot tube is mounted to the underside of said assembly support in parallel relationship to said second members, said pivot tube being provided with aligned trunnions projecting from two sides of said assembly support, pedestals disposed beyond said sides and having aligned bearings in which said trunnions are journaled, and fluid pressure actuated means connecting said assembly support to at least one of said pedestals, said fluid pressure actuated means being extensible to combine with said pedestals and trunnions for supporting said assembly support in either a horizontal or a tilted position.

3. The assembly support according to claim 1, wherein a longitudinal pivot tube is mounted to the underside of said assembly support in parallel relationship to said second members, said pivot tube being provided with aligned trunnions projecting from two sides of said table top, pedestals disposed beyond said sides and having aligned bearings in which said trunnions are journaled, a longitudinal rotating tube mounted to the underside of said assembly support in parallel relationship to said second members and to said pivot tube, said rotating tube having aligned trunnions projecting from two sides of said assembly support, aligned pivot arms disposed beyond said sides and having aligned slots at one end thereof in which said trunnions of said rotating tube are journaled, each of said pivot arms being pivoted to its respective said pedestal between the ends of said pivot arm, and fluid pressure actuated means to move said pivot arms and thus said trunnions of said rotating tube in said slots to rotate said assembly support about said pivot tube from a normally horizontal work assembly position to an inverted work ejection position.

4. The assembly support according to claim 1 including upright truss type supporting legs to support said assembly support in a normally horizontal work assembly position.

5. The assembly support according to claim 1, including at least one third member extending longitudinally of said support and adjustably mounted to said first members, said at least one third member having a plurality of track locators adjustable and fixed thereto for locating door and window assemblies.

6. The assembly support according to claim 5, including at least a fourth member extending longitudinally of said support and in parallel spaced relationship to said first adjustable fixed stop, said at least one fourth member having a plurality of track locators adjustable and fixed thereto, and means for mounting said fourth member, said means for shifting said second stop shifting said fourth member therewith.

7. The assembly support according to claim 6, wherein a plurality of stud locators are adjustable and fixed to said first and second stops.

8. The assembly support according to claim 7, wherein said members are channels.

9. The assembly support according to claim 8, wherein said stud and track locators are slidable and lockable in said channels.

10. The assembly support according to claim 1, wherein said means to shift said selected ones of said second members comprises fluid pressure actuated means.

11. The assembly support according to claim 1, wherein said means for shifting said second stop comprises fluid pressure actuated means.

* * * * *